(12) United States Patent
Nelson et al.

(10) Patent No.: US 8,102,844 B1
(45) Date of Patent: Jan. 24, 2012

(54) HIGH-SPEED SECS MESSAGE SERVICES (HSMS) PASS-THROUGH INCLUDING BYPASS

(75) Inventors: Andrew Bryan Nelson, Danville, CA (US); Paxton Ming Kai Chow, Walnut Creek, CA (US); Vera Alexandrova Snowball, Newark, CA (US); Sherk Chung, San Francisco, CA (US); Abhijit Majumdar, Pleasanton, CA (US)

(73) Assignee: Pivotal Systems Corporation, Pleasanton, CA (US)

( * ) Notice: Subject to any disclaimer, the term of this patent is extended or adjusted under 35 U.S.C. 154(b) by 710 days.

(21) Appl. No.: 11/525,539

(22) Filed: Sep. 21, 2006

(51) Int. Cl.
*H04L 12/56* (2006.01)

(52) U.S. Cl. .................................................... 370/389

(58) Field of Classification Search ................... 370/356, 370/387, 401, 252; 709/224
See application file for complete search history.

(56) References Cited

U.S. PATENT DOCUMENTS

| | | | | |
|---|---|---|---|---|
| 2002/0198988 A1* | 12/2002 | Hirose | ........................ | 709/224 |
| 2004/0047308 A1* | 3/2004 | Kavanagh et al. | ............ | 370/328 |
| 2006/0025871 A1* | 2/2006 | Khalil et al. | .................... | 700/21 |
| 2007/0008972 A1* | 1/2007 | Sifnatsch et al. | ............. | 370/392 |
| 2007/0094548 A1* | 4/2007 | Lev-Ami et al. | ................ | 714/47 |

* cited by examiner

*Primary Examiner* — Man Phan
*Assistant Examiner* — Kevin Lee
(74) *Attorney, Agent, or Firm* — Kilpatrick Townsend and Stockton LLP

(57) ABSTRACT

A method and system for intercepting and forwarding High-Speed SECS Message Services (HSMS) communication between at least two entities, includes a fail-safe bypass to ensure the communications link between the entities is not severed upon failure of the intercepting/forwarding agent. A "pass-through" agent is placed in between two entities communicating via an HSMS link, such that the pass-through agent is able to intercept messages from one entity and forward it to the other entity, and vice versa. The pass-through agent is able to see all messages between the two entities, and is also able to create HSMS messages and send them to one of the entities as if the message had come from the other entity, thereby conferring the ability to inject additional HSMS messages. Should the pass-through agent fail, a bypass mechanism ensures that the two entities can automatically resume HSMS communication without the pass-through agent.

12 Claims, 11 Drawing Sheets

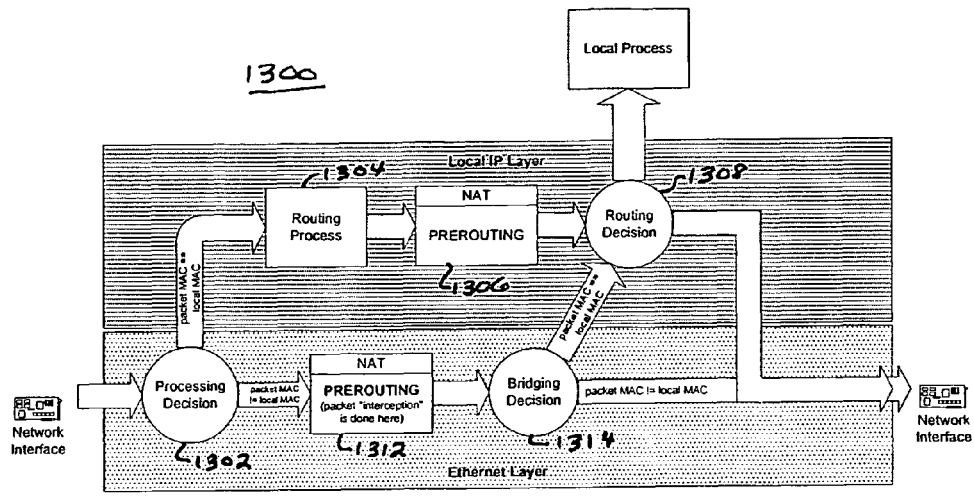

Iptables –t <table> -A <CHAIN> -s <source> –d <destination> –p <protocol> --dport
        <destination port> -j <Jump> --to-destination <new destination>

Iptables syntax
-t                       The table the rule will be added to.
-A                       The chain the rule will be appended to
-s                       The source IP address/network to match
-d                       The destination IP address/network to match
-p                       The protocol to match
--dport                  The destination port to match
-j                       Which action to jump to
--to-destination         The new packet destination (IP address)

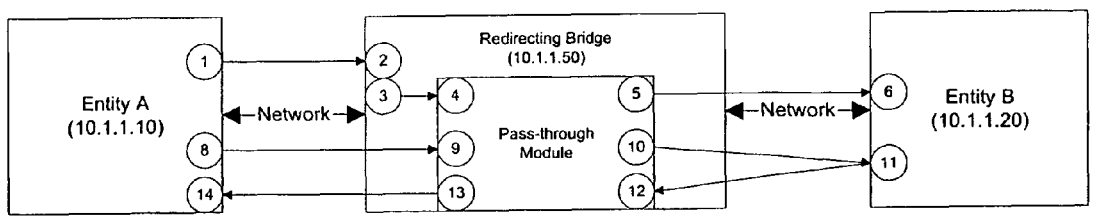

FIGURE 15

HIGH-SPEED SECS MESSAGE SERVICES (HSMS) PASS-THROUGH INCLUDING BYPASS

BACKGROUND OF THE INVENTION

Embodiments in accordance with the present invention relate generally to computer systems and Ethernet-based networking, and, more specifically, relate to systems that intercept messages between HSMS entities in a semiconductor manufacturing environment.

Most modern equipment used for the manufacturing of semiconductors (typically referred to as "tools") come outfitted with a SEMI Equipment Communication Standard (SECS) compliant interface. Often, factory host automation systems (or "hosts" for short) are used to automate the scheduling and recipe selection for these tools. The SECS protocol was initially created circa 1980 to ensure a standard interface existed across equipment manufacturers, so that tools and hosts from different manufacturers would be interoperable. Most modern semiconductor manufacturing facilities automate the operation of the tool by using a factory host system, as shown in FIG. 1.

FIG. 2 describes the protocol stack for SECS communication. Initially, the SECS protocol consisted of two messaging layers. SECS-I is a transport layer based on RS-232 (point-to-point serial). SECS-II is a messaging layer which describes a well-defined message format. Sending SECS-II messages over a SECS-I link, a host could send instructions to the tool, as well as query the tool for status information.

In some cases it may be advantageous to allow an entity other than the host to send SECS-II messages to the tool, or to have an entity other than the tool send SECS-II messages to the host. For example, a third party end-point system on a plasma etcher may need certain information from the tool, such as the current recipe running on the tool, the current step being processed on the tool, and current chamber parameters (i.e. pressure, temperature, power, etc.)

In many cases, however, the only standard method of retrieving this kind of information from the tool is through the SECS interface. Since the SECS-I communication link is based on RS-232 which is point-to-point, and the host and tool are already connected point-to-point, there is no room for a third entity to participate in the SECS communication between the host and the tool.

In order to allow a third entity to participate in the SECS communication, an entity (called the "pass-through agent") may be placed between the host and tool, such that it becomes the intermediary of all SECS communication between the host and tool. FIG. 3 shows a simplified schematic view of a pass-through Agent for a SECS-I Communications Link.

In the configuration shown in FIG. 3, the pass-through agent reads all SECS-II messages from the tool and forwards it to the host, and vice versa. Because RS-232 is point-to-point without specific addressing, the pass-through agent can simply be placed physically in between the tool and the host, and neither tool nor host needs to be reconfigured in any way. In such a manner, the pass-through agent can view all messages going between the tool and the host, and can create new messages and send them to the tool as if they came from the host, and vice versa.

Such a method of invisibly intercepting communications between two entities are commonly referred to as "man-in-the-middle" schemes. Such methods are useful, for example, in allowing a third system to collect data directly from the tool, or for sending commands directly to the tool without having to interface with a host system. FIG. 4 illustrates a simplified schematic view of a high level process for a rudimentary pass-through agent illustrated in FIG. 3.

A "bypass" mechanism can also be incorporated into a pass-through agent. Such a bypass mechanism allows host-tool communication to continue even in the event of failure of the pass-through agent. One example of a bypass mechanism is a serial communication card containing two serial ports which can be mechanically shunted together if power is lost. If the pass-through agent should fail, the two ports of the serial communication card would be shunted together to form the equivalent of a serial cable in between the two ports, and thus between the tool and host. FIG. 5 shows a simplified block diagram of an embodiment of such a bypass card.

Circa 1995, about 15 years after SECS-I was created, a newer SEMI protocol called High Speed SECS Message Services (HSMS) was created. HSMS replaced the SECS-I layer in the SECS communication protocol, while keeping the SECS-II message format in place. FIG. 6 shows a simplified schematic view of the SECS protocol stack using HSMS. As evident from comparing FIG. 6 to FIG. 2, in HSMS, SECS-I and below have been replaced by HSMS on top of TCP/IP.

While SECS-I was a point-to-point RS-232 serial protocol, HSMS is a TCP/IP based network protocol on Ethernet. A major difference between these two is that the SECS-I communication link is physically point-to-point, while the TCP/IP-based HSMS communication link is a virtual one across an Ethernet network that could contain many nodes. FIG. 7 provides a simplified schematic view of an example of an Ethernet network configuration.

With HSMS, many devices can be networked over a hub. When one device sends a message to another device over the Ethernet, the message is broken down into TCP/IP packets which are broadcasted to all devices on the hub. Each device compares its own IP address to the destination IP address in the TCP/IP packets, and if there is a match the device will read the packets. If there is not a match, the device would typically ignore the packets. Since HSMS uses TCP/IP with defined source and destination addressing, it becomes difficult to implement the pass-through agent by simply putting something physically in between in the same manner described for SECS-I.

One approach for implementing a pass-through agent is to configure the host and tool to send HSMS messages to the IP address and port of an intermediary pass-through agent, and have the intermediary then forward the messages to the other entity. FIG. 8 shows a simplified schematic view of one embodiment of such a configuration.

However, the approach shown in FIG. 8 may offer some issues. For example, in FIG. 8, the intermediary is not invisible. Both the host and the tool need to be reconfigured to point to the IP address and port of this new intermediary.

Moreover, in the configuration of FIG. 8 the software performing the forwarding function would only forward HSMS messages. Other types of network traffic that are supposed to go from tool to host and vice-versa (such as SNMP packets), might not be forwarded by the intermediary.

The apparatus of FIG. 8 also fails to provide a mechanism for a fail-safe bypass. If the intermediary failed, the host and tool would continue trying to send HSMS messages to the IP address of the failed intermediary. Even if a bypass card similar to the one shown in FIG. 5 used for SECS-I were employed, the host and tool would still be attempting to send messages to the IP address of the failed intermediary. The end result would be a loss of HSMS communication between the host and tool.

In view of the above, there is a need in the art for methods and apparatuses involving improved pass-through communication under the HSMS standard.

BRIEF SUMMARY OF THE INVENTION

Embodiments in accordance with the present invention relate to methods and systems for intercepting and forwarding High-Speed SECS Message Services (HSMS) communication between at least two entities. Certain embodiments in accordance with the present invention also include a fail-safe bypass to ensure the communications link between the entities is not severed upon failure of the intercepting/forwarding agent. In accordance with certain embodiments, a "pass-through" agent is placed between two entities that are communicating via an HSMS link, such that the pass-through agent is able to intercept messages from one entity and forward them to the other entity, and vice versa. The pass-through agent is able to see all messages passing between the two entities, and is also able to create HSMS messages and send them to one of the entities, as if the message had come from the other entity, thereby conferring the ability to inject additional HSMS messages. Should the pass-through agent fail, a bypass mechanism ensures that the two entities can automatically resume HSMS communication without the pass-through agent.

An embodiment of a method in accordance with the present invention comprises using an Ethernet bridge to provide Ethernet-based network connectivity between a first HSMS entity and a second HSMS entity. In accordance with certain embodiments, the method may further comprise using the Ethernet bridge to gain access to the Ethernet-based communication between the first HSMS entity and the second HSMS entity.

An alternative embodiment of a method in accordance with the present invention comprises receiving on an Ethernet port an HSMS message including an original set of system bytes, generating a set of system bytes, modifying the HSMS message by replacing the original set of system bytes with the generated set, and forwarding the modified HSMS message to an original intended recipient.

An embodiment of a system in accordance with the present invention comprises a first HSMS entity configured to be in communication with a second HSMS entity through an Ethernet network, and an Ethernet bridge. In accordance with certain embodiments, the system may further comprise a pass-through agent.

An embodiment of an apparatus in accordance with the present invention, comprises, a semiconductor fabrication tool including a processor; a semiconductor fabrication facility host computer; an Ethernet network in electronic communication with the processor and with the host computer of the semiconductor fabrication facility; and a computer system comprising a second processor and a computer readable storage medium. The computer readable storage medium has code stored thereon to direct the second processor to recognize an HSMS message having an identification that is addressed to an intended recipient from an originating entity; alter the HSMS message identification, and forward the altered HSMS message to the intended recipient.

Various additional objects, features and advantages of the embodiments of the present invention can be more fully appreciated with reference to the detailed description and accompanying drawings that follow.

BRIEF DESCRIPTION OF THE DRAWINGS

FIG. 13 shows a simplified schematic view of an Iptables Packet Flow in accordance with an embodiment of the present invention.

FIG. 14 shows a simplified schematic view of a basic Iptables syntax in accordance with an embodiment of the present invention.

FIG. 15 shows a simplified schematic view of a step by step connection initiation in accordance with an embodiment of the present invention.

DETAILED DESCRIPTION OF THE INVENTION

Figure 1:
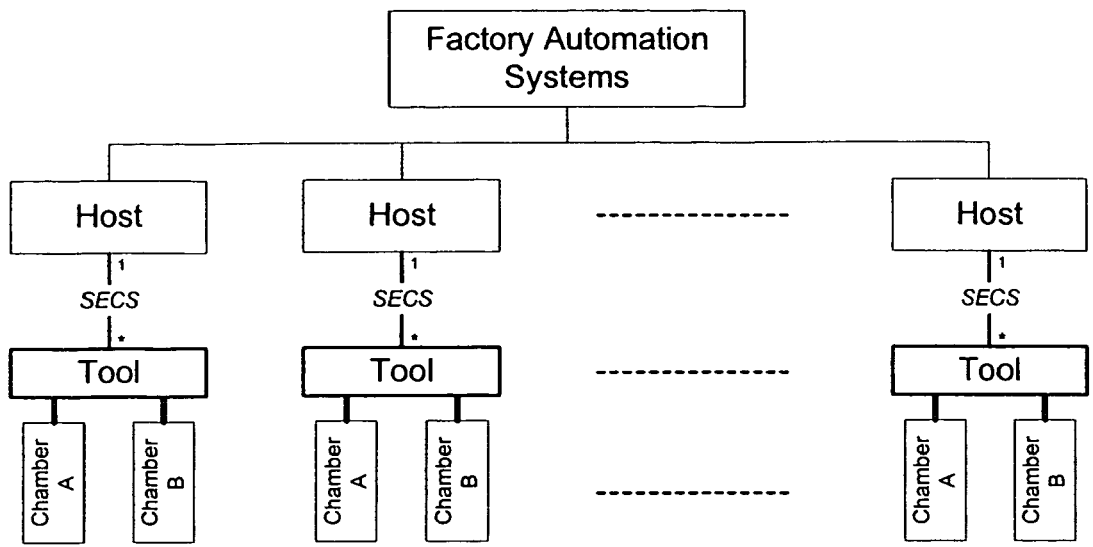
FIG. 1 shows a simplified schematic view of high level system architecture for automation of a semiconductor fabrication facility.
Figure 2:
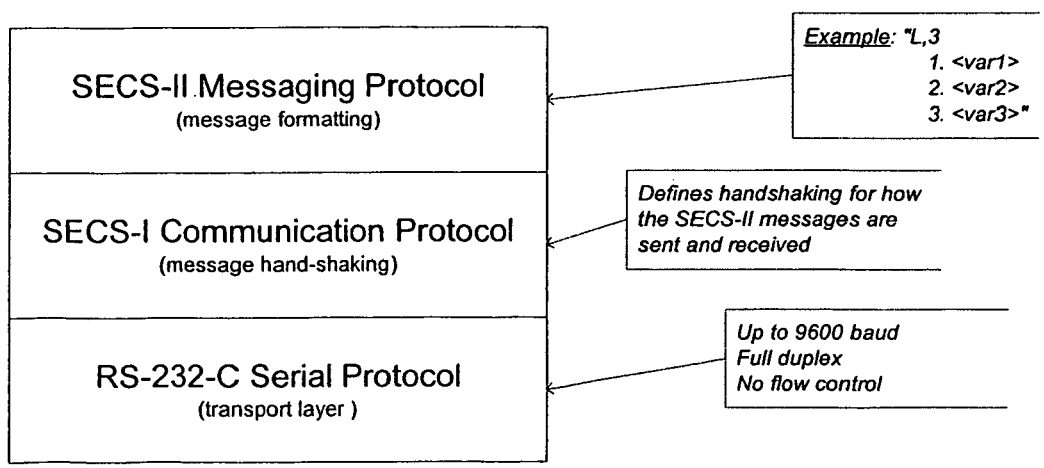
FIG. 2 shows a simplified schematic view of a protocol stack for the SECS communication link using SECS-1.
Figure 3:
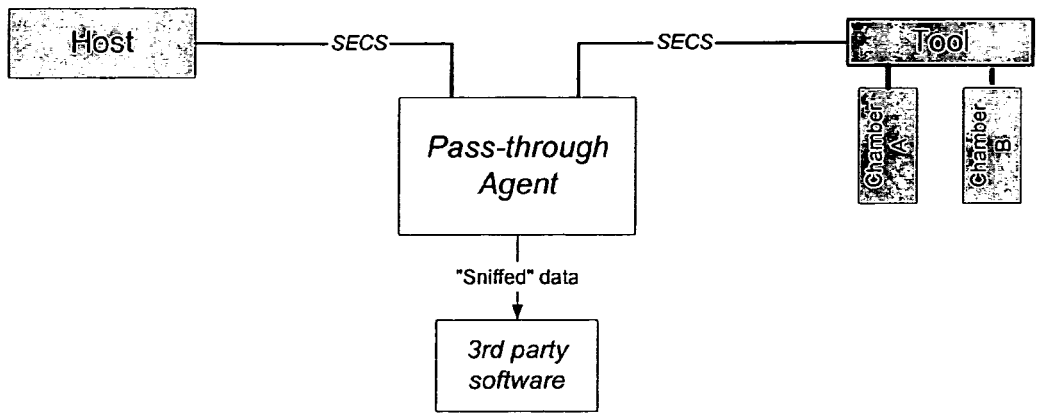
FIG. 3 shows a simplified schematic view of a high level architecture diagram of a semiconductor fabrication system including a pass-through agent.
Figure 4:
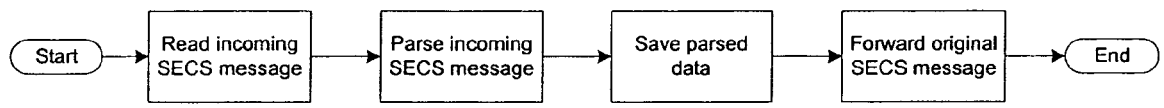
FIG. 4 shows a simplified schematic view of a high level process for a rudimentary pass-through agent.
Figure 5:
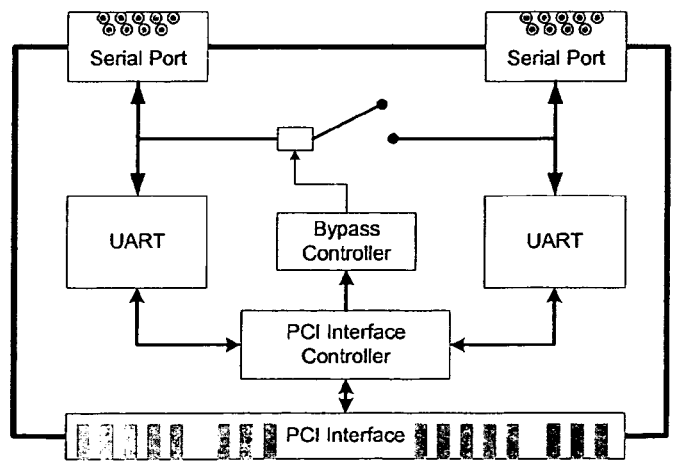
FIG. 5 shows a simplified schematic view of a block diagram of a serial bypass card.
Figure 6:
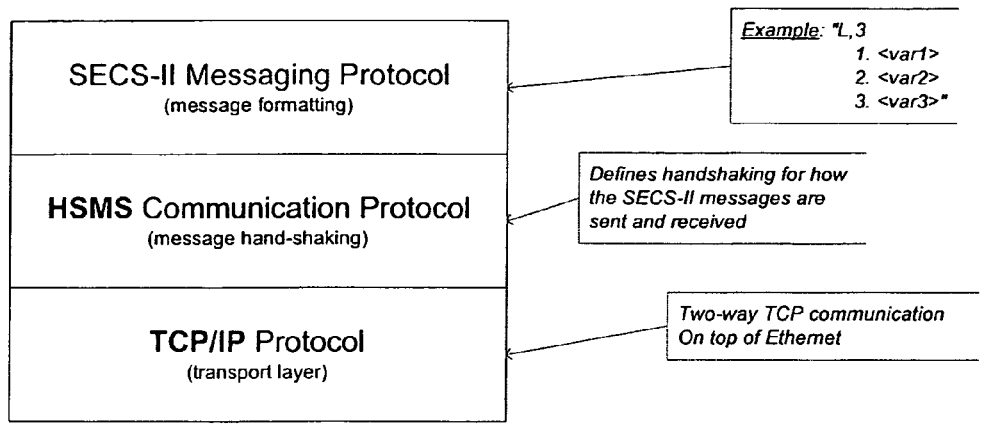
FIG. 6 shows a simplified schematic view of a protocol stack for SECS communication link using HSMS.
Figure 7:
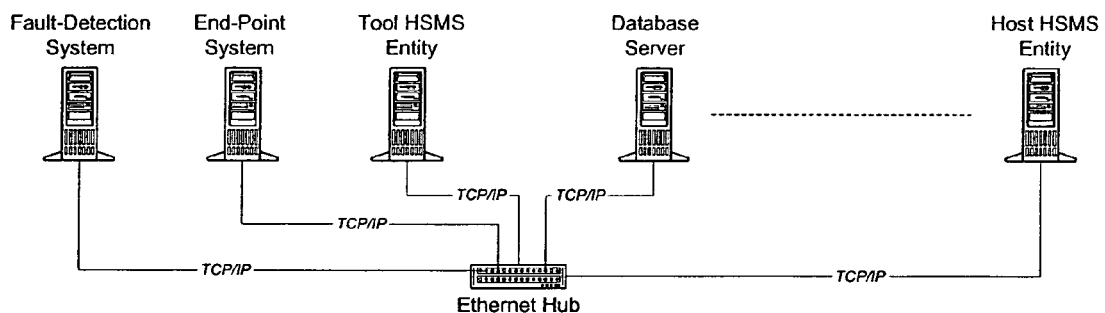
FIG. 7 shows a simplified schematic view of an example Ethernet network configuration in a semiconductor fabrication facility.
Figure 8:
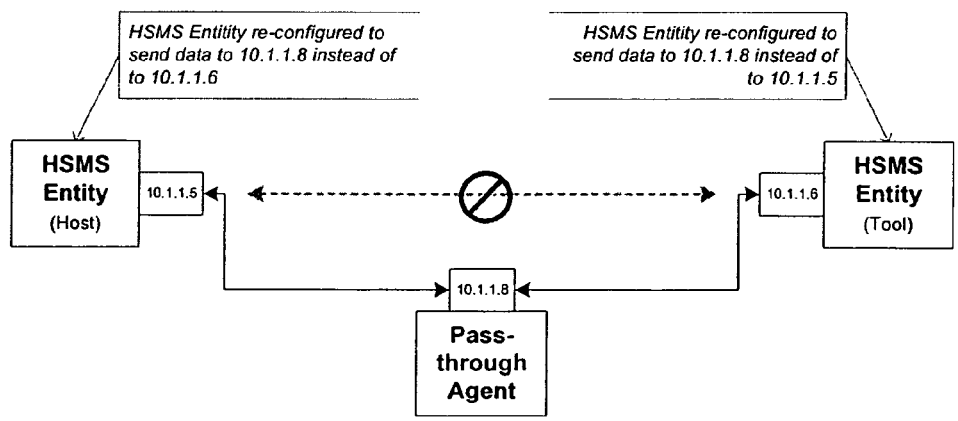
FIG. 8 shows a schematic view of a simple pass-through agent that requires reconfiguration of the existing HSMS entities.

Embodiments in accordance with the present invention relate to methods and systems for intercepting and forwarding High-Speed SECS Message Services (HSMS) communication between at least two entities, includes a fail-safe bypass to ensure the communications link between the entities is not severed upon failure of the intercepting/forwarding agent. A "pass-through" agent is placed in between two entities that are communicating via an HSMS link, such that the pass-through agent is able to intercept messages from one entity and forward it to the other entity, and vice versa. The pass-through agent is able to see all messages between the two entities, and is also able to create HSMS messages and send them to one of the entities as if the message had come from the other entity, thereby conferring the ability to inject additional HSMS messages. Should the pass-through agent fail, a bypass mechanism ensures that the two entities can automatically resume HSMS communication without requiring the pass-through agent.

Embodiments in accordance with the present invention relate to systems and methods for creating a pass-through agent for HSMS communication, which generally address issues raised above. Specifically, embodiments of HSMS pass-through agents in accordance with the present invention could exhibit one or more of the following attributes.

1. Be invisible. No reconfiguration of the tool or host is required.
2. Enable all other Ethernet traffic to flow between host and tool.
3. Allow for a fail-safe bypass in the event the intercepting agent should fail.

A pass-through agent for HSMS communication exhibiting some or all of the previously mentioned benefits can be created using the following method:

1. An Ethernet Bypass Card is installed on a computer. The bypass card has two Ethernet ports that will mechanically shunt together to form the equivalent of an Ethernet line if any of the following conditions take place:
   a. Power to the Ethernet card is lost
   b. An onboard watchdog timer fails to receive a continuous "ping" within a pre-set interval
   c. The card receives an I/O command instructing it to shunt the ports together
2. An Ethernet bridge is created on that computer using the two Ethernet ports on the bypass card.
3. The Ethernet bridge is physically placed in between an entity (host or tool) and the nearest network hub. The Ethernet bridge allows all Ethernet traffic (not just TCP traffic) to flow through.
4. IP Routing rules are used on the Ethernet bridge to re-route HSMS packets to the pass-through software that can read the messages and forward them to the intended recipient.
5. The pass-through software is configured to know the IP addresses of the HSMS entities being intercepted such that it becomes a man-in-the-middle between the two HSMS entities.
6. The pass-through software is set up to continuously "ping" the watchdog timer on the bypass card with a pre-set configured interval.
7. The pass-through software reads all HSMS messages coming from one HSMS entity, replaces the system bytes of the HSMS message to ensure there are no duplicates, and forwards the resulting HSMS message with the new system bytes to the other HSMS entity.
8. The pass-through software can also create HSMS messages and send them to one entity as if it had come from the other entity.

Figure 9:
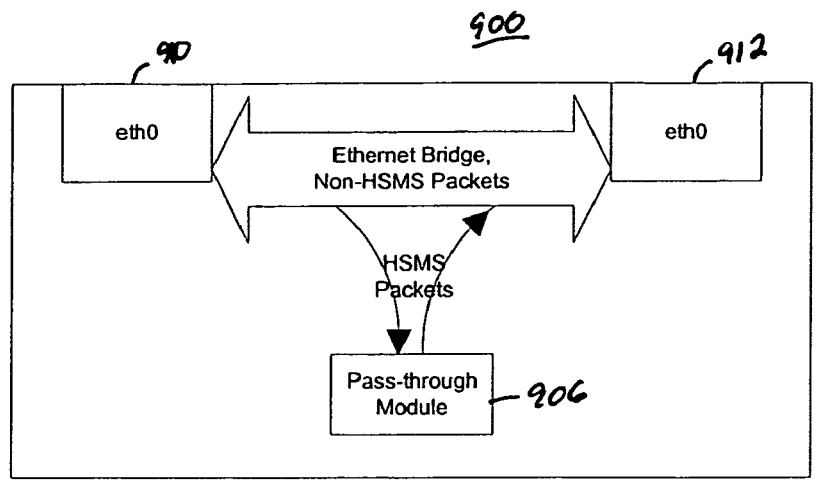
FIG. 9 shows a simplified schematic view of an overview of packet flow in accordance with an embodiment of the present invention.

FIG. 9 is a simplified schematic diagram illustrating high level packet flow in an example of an HSMS pass-through with bypass capability in accordance with an embodiment of the present invention. Specifically, an embodiment of the HSMS pass-through system 900 in accordance with the present invention can be broken down into the following major components: a computer 902, a redirecting Bridge 904, a pass-through module 906, and an Ethernet Bypass Card 908

The "Computer" may be any computer with an operating system that can support the creation of an Ethernet bridge between two Ethernet ports 910, 912. The redirecting bridge allows all Ethernet traffic to flow between the two bridged Ethernet ports, but has the special capability of routing packets according to pre-defined routing rules to the pass-through module. In this example, the routing rules would be configured to re-route HSMS packets sent between host and tool.

The Pass-through Module receives redirected HSMS traffic, modifies the message identification (to ensure uniqueness of the identification when the message "injection" function is performed), and forwards the message to the originally intended recipient. In addition, the Pass-through Module can send new HSMS messages to an entity as if it came from the other entity—a process called "injection" of HSMS messages.

Figure 10:
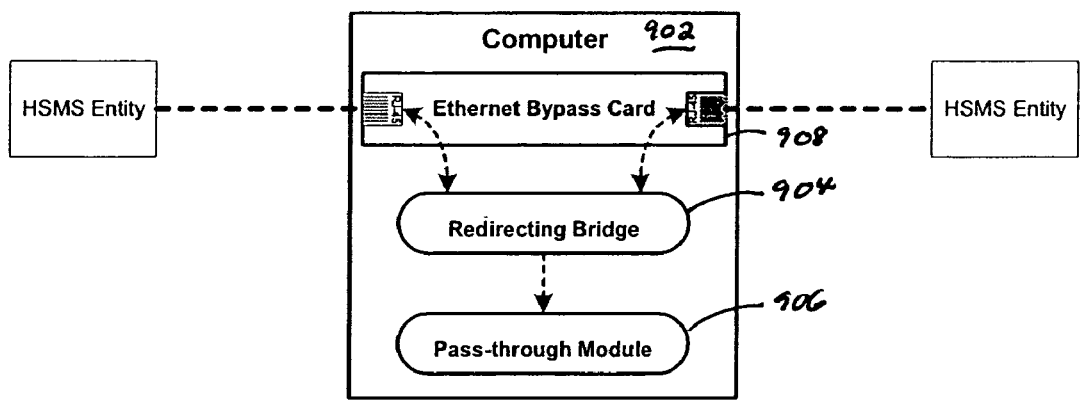
FIG. 10 shows a simplified schematic view of a logical architecture diagram of an HSMS Pass-through System with bypass capabilities in accordance with an embodiment of the present invention.

The Ethernet Bypass Card also provides specialized hardware that enables the fail-over feature in the event the Pass-through Module should fail. FIG. 10 shows a simplified logical architecture diagram of a computer system in accordance with an embodiment of the present invention.

In the particular embodiment shown in FIG. 10, the "Computer" 902 is a modern computer having an Intel x86 architecture running a Linux operating system. In this embodiment, computer 902 has a minimum of one PCI communication interface which is used for the two-port Ethernet bypass card 908. Other combinations of computer architecture, operating system, and expansion interface could be used to achieve similar purposes, since the method of using an Ethernet bridge is independent of any of those particular specifications.

During system boot, an Ethernet bridge is created to listen for traffic on the two Ethernet bypass card interfaces. This Ethernet bridge allows for two Ethernet networks to communicate with each other by having packets passed along from one network to the other. In the case of the particular embodiment of a system illustrated in FIG. 10, the bridge connects the Ethernet networks connected to each of the interfaces on the Ethernet bypass card.

While a typical Ethernet bridge blindly passes packets from one interface onto the next interface, an embodiment of an Ethernet bridge employed hi accordance with the present invention includes logic allowing it to use routing rules to selectively "redirect" packets to the pass-through module instead. The routing rules are created such that if a packet is being sent from the IP address of one of the HSMS entities to the IP address and HSMS listening port of the other HSMS entity, then the packet is redirected to the Pass-through Module. More specifically, the bridge redirects the packet to the IP address and port that the Pass-through Module is listening on.

Figure 11:
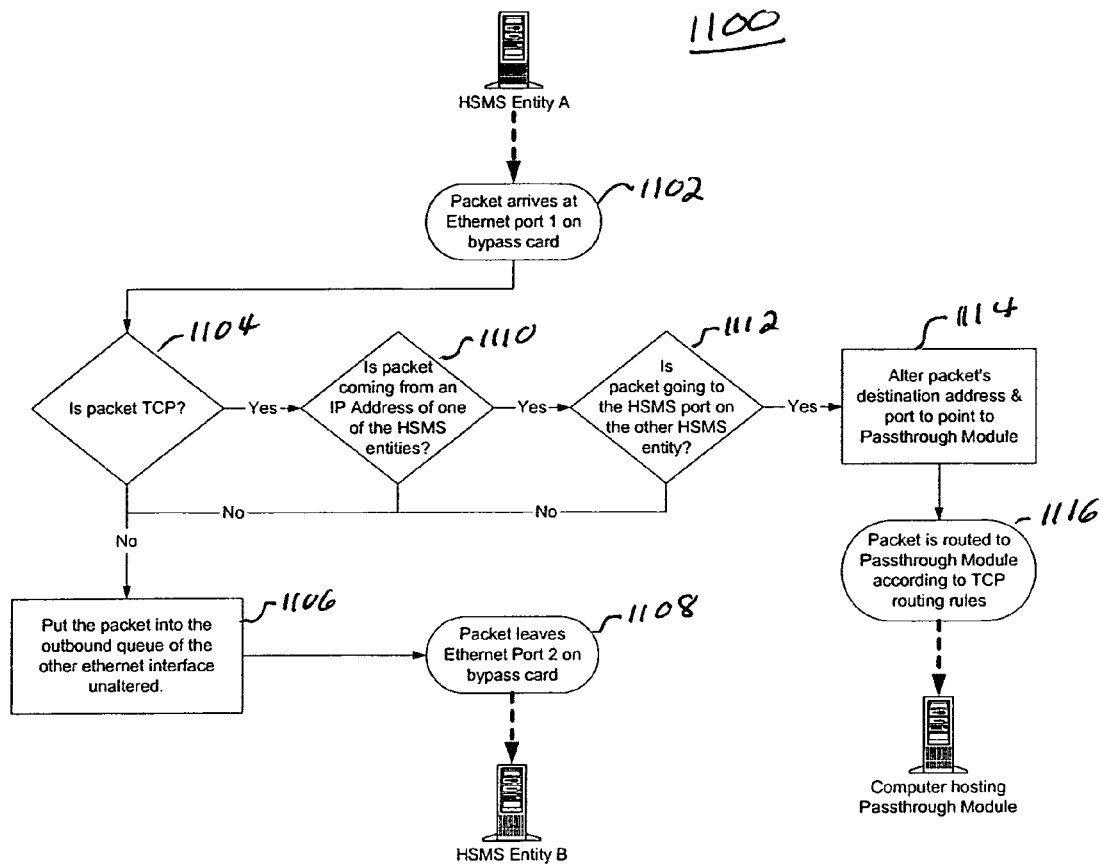
FIG. 11 shows a simplified schematic view of a high level process flow of an embodiment of a redirecting bridge in accordance with the present invention.

FIG. 11 is a simplified flow diagram showing how packets are inspected and routed by the Redirecting Bridge. In a first step 1102 of flow 1100, a packet arrives at Ethernet port 1 on the bypass card. In step 1104, the packet is examined to determine whether or not it is TCP.

If in step 1104 the packet is determined not to be TCP, in step 1106 it is placed unaltered into the outbound queue of the other Ethernet interface. In step 1108, the packet then leaves Ethernet Port 2 on the bypass card and is transmitted to the other HSMS entity.

If in step 1104 the packet is determined to be TCP, in step 1110 the packet is examined to see if it is coming from an IP address of one of the HSMS entities. If not, the packet is sent on unaltered per steps 1106 and 1108.

If in step 1110 the packet is determined to be coming from an IP address of one of the HSMS entities, in step 1112 the packet is examined to see if it is going to the HSMS port on the other HSMS entity. If not, the packet is sent on unaltered per steps 1106 and 1108.

If in step 1112 the packet is determined to be headed for the HSMS port on the other HSMS entity, in step 1114 the destination address and port is altered to direct it to the passthrough module. In step 1116, the packet is routed to the passthrough module according to TCP routing rules. In accordance with a particular embodiment, the redirecting bridge redirects packets using the iptables packet filtering software standard in Linux kernels 2.4 and above.

Figure 12:
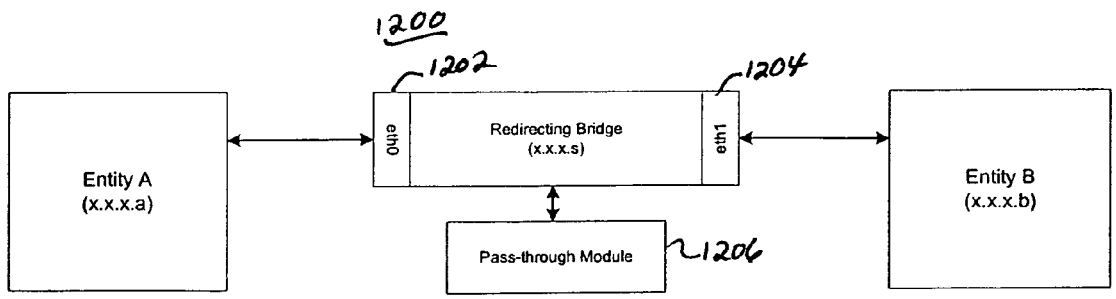
FIG. 12 shows a simplified schematic view of a general setup of the embodiment of the redirecting Bridge of FIG. 11.

FIG. 12 is a simplified schematic block diagram of the HSMS pass-through system 1200 in accordance with one embodiment of the present invention. Both eth0 1202 and eth1 1204 are assigned zeroed (invalid) IP addresses. However, the bridge they create will be assigned a valid IP address. Packets will pass between systems connected to eth0 and eth1 untouched, unless they match the criteria for HSMS packets, in which case they will be routed to the Pass-through Module 1206 locally.

In the specific embodiment shown in FIG. 12, eth0 and eth1 are bridged together using the brctl utility in Linux. Both Ethernet adapters used in the bridge have their network addresses zeroed out before the bridge is created which means that their IP address should be 0.0.0.0.

The next stage is to set up the redirecting portion of the redirecting bridge. To do this, iptables rules are configured to re-route the packet if they meet the criteria for an HSMS packet. The redirection rules are appended to the PREROUTING chain and to the NAT (Network Address Translation) table. iptables is a packet manipulation program for Linux: more information can be found at http://www.netfilter.org. It is well known to one skilled in the art, that different combinations of packet routing tools and operating systems could be used to achieve similar functionality, and thus the present invention should not be limited in scope to only iptables on Linux.

FIG. 13 shows a basic and abbreviated flow diagram of iptables and where the various decisions are made. In flow 1300, when a packet is first received by an Ethernet device it is passed on to the operating system and then onto iptables, which makes a processing decision regarding this packet in step 1302. If in step 1302 the destination MAC address is that of the local machine, the packet is sent to the IP layer for further processing in steps 1304-1308.

If in step 1302 the destination MAC address is not that of the local machine, the packet is passed on to the PREROUTING chain. In step 1312, the PREROUTING chain allows for the changing of the destination address, either the MAC address and or the IP address, this is known as NAT (Network Address Translation).

After the PREROUTING chain has processed the packet in step 1312, the packet is passed on for another bridging decision in step 1314. This is necessary because the packet may have been modified by the PREROUTING chain. If in step 1314 the MAC or the IP addresses are for the local machine the packet is passed to the routing decision in step 1308. If in step 1314 the MAC or the IP addresses are not for the local machine, the packet is passed to the other Ethernet interface in the bridge.

When the local IP layer receives a packet, the packet will first pass through the IP PREROUTING chain just as a packet would at the Ethernet layer. Here again the destination address can be changed or NAT'ed in step 1306.

After the packet passes through the PREROUTING chain, the packet will then pass to the routing decision in step 1308. Here the packet is inspected to determine where this packet should go. It is possible, for example, for a packet to be routed to an Ethernet device which is not part of a bridge. If the packet is destined for the local machine it is passed up the chain to the local processes.

FIG. 14 shows the basic of Iptables syntax. An example of an iptables command is as follows:

iptables -t nat -A PREROUTING -s 10.1.1.120 -d 10.1.1.110 -p tcp --dport 2038 -j DNAT --to-destination 10.1.1.30:5000

Example commands for configuring the gateway for the bridge are route add default gw <bridge_gateway> <bridge_name>
route del default gw <bridge_gateway> <bridge_name>

FIG. 15 is a simplified block diagram showing the various steps an HSMS/TCP packet goes through between two HSMS entities. The HSMS client is referred to as the "active" HSMS entity (i.e., the one initiating the TCP connection) and the HSMS server is referred to as the "passive" HSMS entity (i.e., the one waiting for a client connection). FIG. 15 shows where each of the following steps of the process is occurring.
1. Entity A (active) initiates a TCP connection with Entity B (passive).
2. The redirecting bridge receives the packet and inspects it.
3. The redirecting bridge determines the packet is bound for an entity which the Pass-through Module proxies (Entity B) and redirects the packet to the Pass-through Module.
4. The Pass-through Module receives the packet and completes the connection with Entity A.
5. The Pass-through Module initiates a connection with Entity B.
6. Entity B receives the connection initiation and completes the connection.
7. Communication is now setup and can flow in either direction via the Pass-through Module.
8. Entity A sends an HSMS message to Entity B.
9. HSMS message bound for Entity B is redirected to the Pass-through Module.
10. The Pass-through Module processes the message and sends the result to Entity B.
11. Entity B receives the message and replies.
12. The Pass-through Module receives the message.
13. The Pass-through Module sends the reply on to Entity A.
14. Entity A receives the reply.

Consider the following examples with the following configurations:

Host IP Address: 10.1.1.57 (active HSMS entity, i.e. HSMS "client")
Host HSMS Port: 19321 (client socket port)

| | | |
|---|---|---|
| Tool IP Address: | 10.1.1.125 | (passive HSMS entity, i.e. HSMS "server") |
| Tool HSMS Port: | 5000 | (server socket port) |
| Pass-through Module IP: | 10.1.1.30 | |
| Pass-through Listening Port: | 5000 | (server socket connected to Host) |
| Pass-through Client Port: | 12789 | (client socket connected to Tool) |

The Redirecting Bridge is set up with the following rules:

If ((src_ip ==10.1.1.57) AND (dest_ip ==10.1.1.125) AND (dest_port ==5000)) THEN SET dest_ip =10.1.1.30 AND SET dest_port =5000

If ((src_ip ==10.1.1.125) AND (dest_ip ==10.1.1.57) AND (src_port ==5000)) THEN SET dest_ip =10.1.1.30 AND SET dest_port =12789

Figure 16:
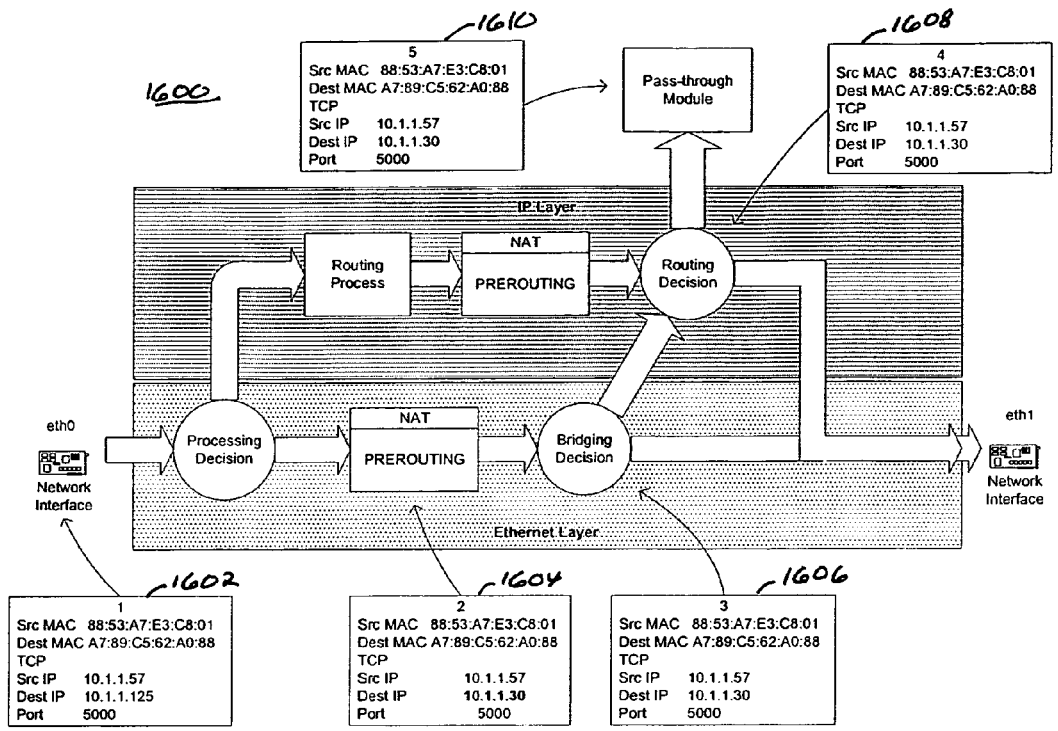
FIG. 16 shows a simplified schematic view of an example packet flow for intercepted HSMS packet in accordance with an embodiment of the present invention.

FIG. 16 is a simplified schematic diagram showing an example of what happens when an HSMS packet is sent from the host (10.1.1.57) to the tool (10.1.1.125). Because the packet matches the profile for HSMS it will be intercepted and redirected.

Specifically, in flow 1600, in stage 1602 (1), the packet first arrives at eth0. The packet is then processed by the first processing decision. This processing decision looks at the destination MAC address to see if it is for a local MAC address. Since the packet is not bound for a local MAC address it is passed on to the PREROUTING chain.

In stage 1604 (2), the packet is inspected to see if it meets the criteria for an HSMS packet which it does and the destination address is changed to be that of the Pass-through Module. In stage 1606 (3), the Bridging decision looks at the packet to see if it needs to be forwarded to a MAC address accessible by the other Network Interface. In stage 1606 (4), the packet is passed to the Routing Decision which is in the IP layer. This decision looks at the packet to determine where its destination IP address is located, in this case it's local to the machine. In stage 1608 (5), the packet is received by the Pass-through Module.

Figure 17:
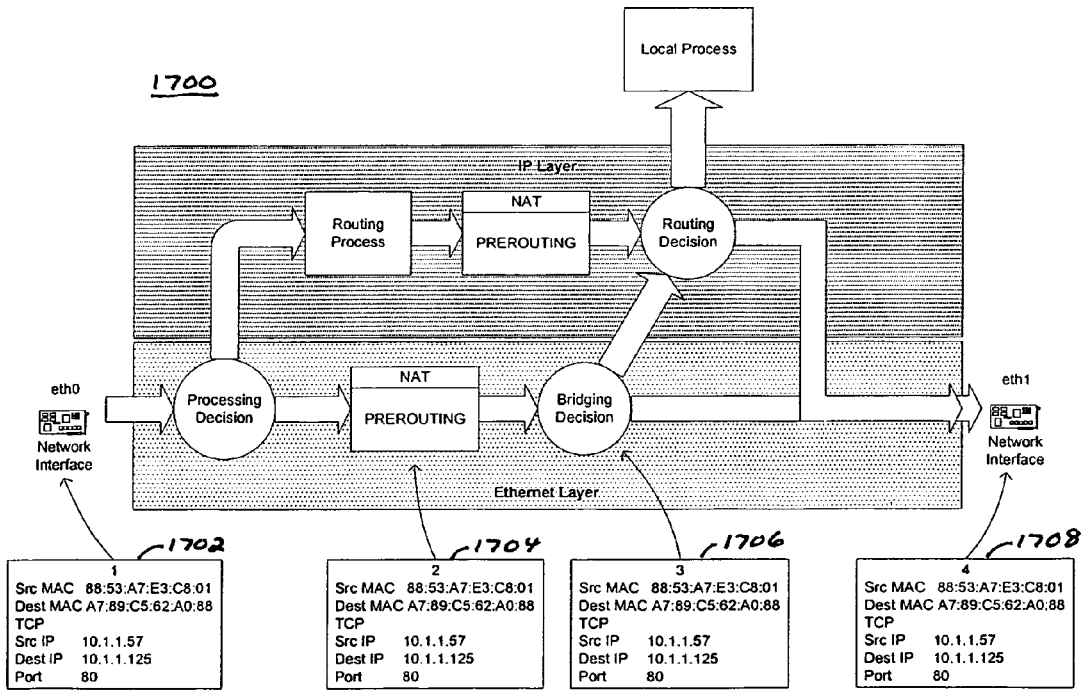
FIG. 17 shows a simplified schematic view of an example packet flow of non-intercepted HTTP packet in accordance with an embodiment of the present invention.

FIG. 17 is a simplified schematic diagram showing what happens to a normal web packet traveling from the host (10.1.1.57) to the tool (10.1.1.125). In this case the packet will not be redirected because it does not match the HSMS redirection profile (the destination port is not 5000).

Specifically, in stage 1702 (1) of flow 1700, the packet arrives at eth0 and is passed to the processing decision to determine which layer will process it. In stage 1704 (2), the packet is then passed to the PREROUTING chain for inspection. Since the destination port is not 5000, the packet is left unchanged.

In stage 1706 (3), the Bridging decision inspects the packet and determines that the destination MAC address is located on the other Network Interface. In stage 1708 (4), the packet it retransmitted on the other Network Interface.

Figure 18:
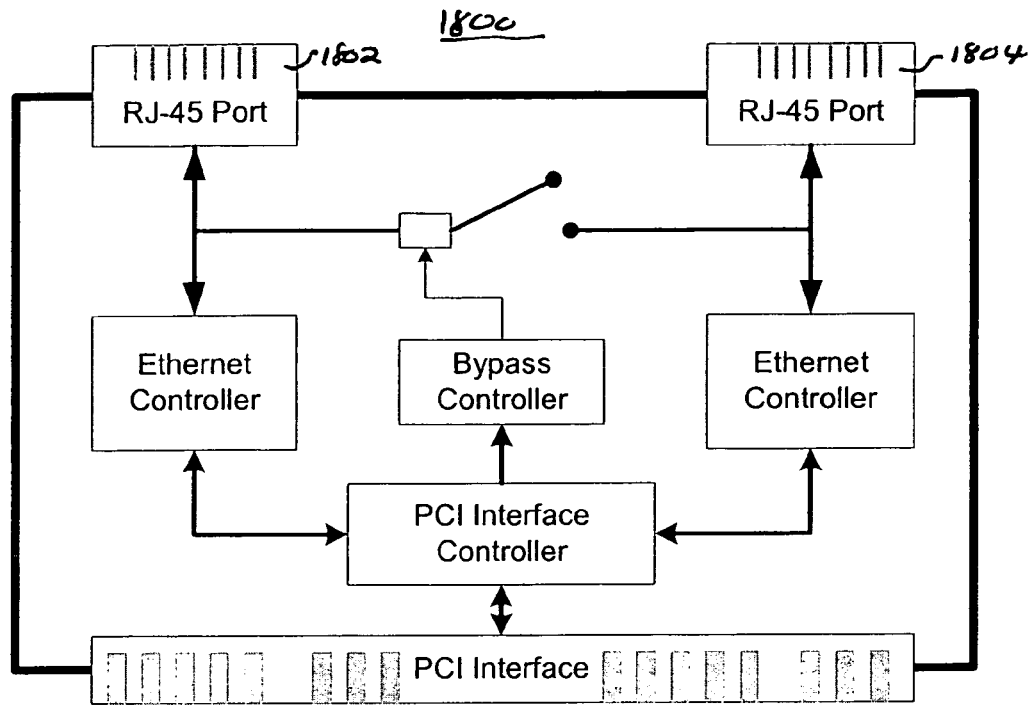
FIG. 18 shows a simplified schematic view of a block diagram of an Ethernet bypass card in accordance with an embodiment of the present invention.

The Ethernet Bypass Card in accordance with an embodiment of the present invention has two separate Ethernet network ports and has the ability to electrically shunt (or "failover") together the two Ethernet ports at the connector. FIG. 18 shows a simplified block diagram of such an Ethernet Bypass Card 1800.

Figure 19:
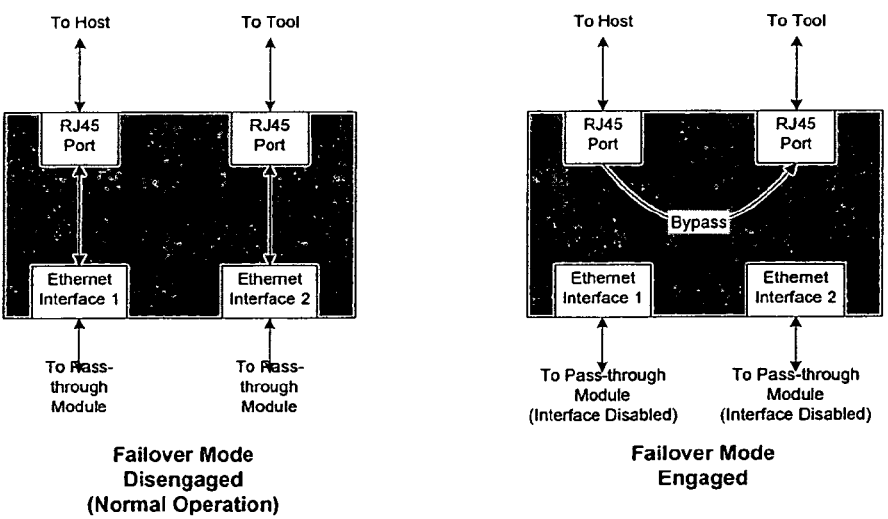
FIG. 19 shows a simplified logic diagram showing operation of Ethernet Bypass Card Modes in accordance with embodiments of the present invention.

FIG. 19 is a simplified logic diagram illustrating how the Ethernet Bypass Card operates when the failover mode is engaged and disengaged. The specialized network adapter uses a PCI slot in the computer system running the Redirecting Bridge.

An embodiment of an Ethernet Bypass Card in accordance with the present invention may include a Hardware Watchdog feature that will automatically engage the failover mode if its timer is not reset on a periodic basis. This Hardware Watchdog feature can be enabled or disabled, and the timeout value is also configurable. The timer is reset by the Pass-through Module on a periodic basis as long as the Pass-through Module is running normally. If the Pass-through Module is shut down or if it fails for some unexpected reason, then the timer expires and the card jumps into failover mode.

One of the primary purposes of the Pass-through Module is to receive intercepted HSMS messages from one HSMS entity, and to forward the messages to the other HSMS entity. The Pass-through Module also has the capability to parse and assemble HSMS messages, which may allow it to also perform some or all of the following functions:

"sniff" the contents of the HSMS messages going between HSMS entities;

modify the HSMS messages so that the data content is altered on its way to its original destination; and create entirely new HSMS message and send them to one entity as if it had come from the other entity.

The Pass-through Module has three primary procedures. The primary purpose of each procedure is described as follows:

The primary purpose of Procedure 1 is to read intercepted messages and forward them to the intended recipient. This allows for the "sniffing" of the HSMS message content going in between the two HSMS entities. The primary purpose of Procedure 2 is to inject newly created messages into the HSMS communication link as if one of the entities had sent it. The primary purpose of Procedure 3 is to continuously ping the watchdog timer on the Ethernet Bypass Card to keep it from switching into bypass mode.

Figure 20:
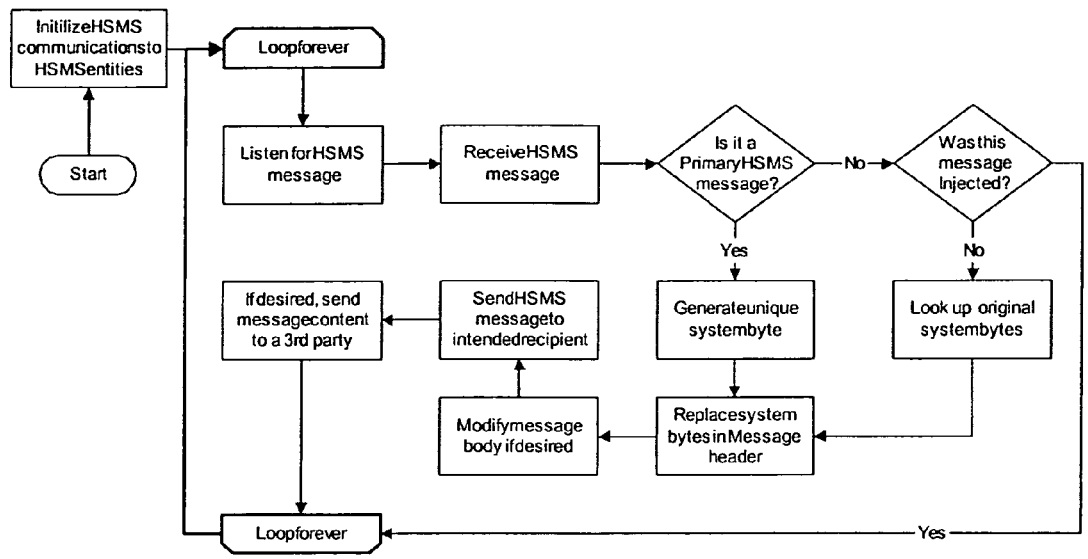
FIG. 20 shows a simplified schematic view of a high level process flow for Procedure 1 of the Pass-through Module in accordance with an embodiment of the present invention.

FIG. 20 shows a simplified, high level process flow of Procedure 1. In this process, the intercepted messages are modified by replacing the system bytes to allow for injection. The system bytes form a unique ID that identifies an HSMS transaction. No two concurrent messages should have the same system bytes. New system bytes are generated for a newly created Injected message. However, there is a slight chance that the immediately after the primary Injected message is sent, one of the HSMS entities sends a message with the exact same system bytes. In order to avoid this scenario, the system bytes are replaced to ensure no duplicates will be used. Response messages to the intercepted messages in the HSMS transaction are modified by replacing the new system bytes back to the original system bytes associated with the appropriate new system bytes to route the response messages to the appropriate HSMS entity. A mapping between the original set of HSMS system bytes and the generated set of HSMS system bytes can be stored in a computer readable medium.

Figure 21:
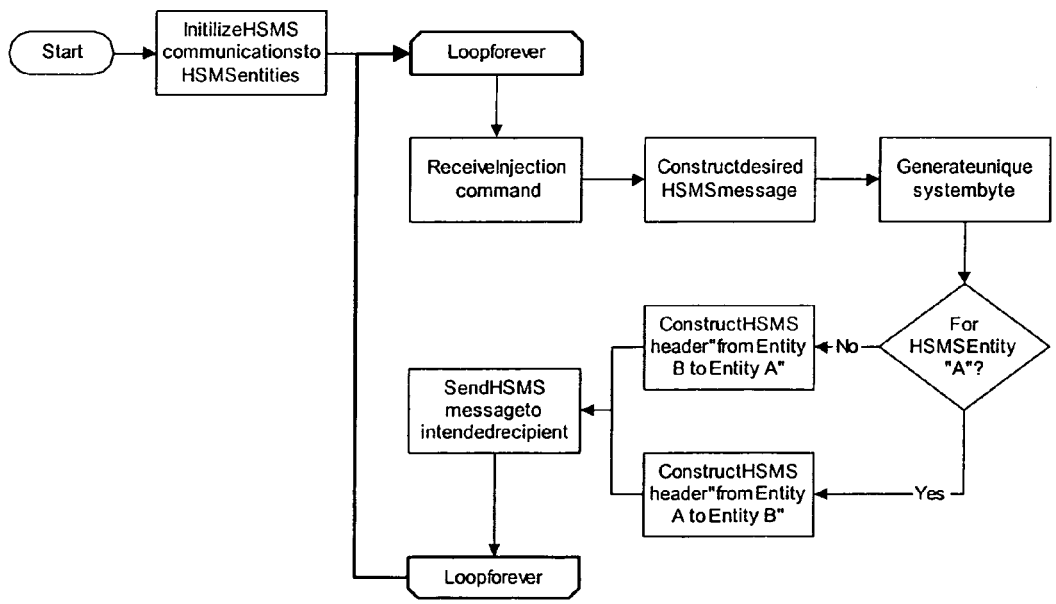
FIG. 21 shows a simplified schematic view of a high level process flow for Procedure 2 of the Pass-through Module in accordance with an embodiment of the present invention.

FIG. 21 shows a simplified, high level process flow for Procedure 2. This process allows for the injection of new messages into the HSMS communication stream. When a new HSMS message is created, it is sent to an HSMS entity and made to look as if it was sent from the other HSMS entity, rather than from the Pass-through Module. If the message injection functionality was not used, this process would not be needed.

Figure 22:
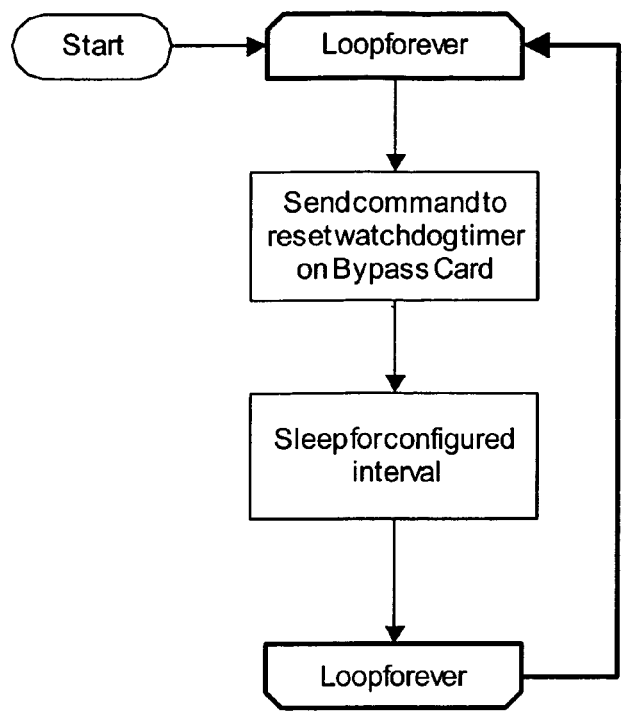
FIG. 22 shows a simplified schematic view of a high level process flow for Procedure 3 of the Pass-through Module in accordance with an embodiment of the present invention.

FIG. 22 shows a simplified, high level process flow for Procedure 3. This process continuously pings the watchdog timer on the Ethernet Bypass Card to prevent it from going into bypass mode. If fail-over bypass capability were not used, this process would not be needed.

The following are the most likely failure scenarios to occur during the course of normal operation. The following scenarios assume that Entity A is active and Entity B is passive.

The following scenarios rely on the HSMS standard timeouts, of which there are five (T1-T5) basic ones. However, only two (T3 and T5) of these standard timeouts are of concern for these failure scenarios, which represent the worst case scenarios. T3 is the Reply timeout, and has a default of 45 seconds. This is the length of time HSMS is willing to wait for a reply message before the link is considered to have failed. T5 is the Connect Separation Time, and has a default of 5 seconds. This is the length of time HSMS will wait before attempting to re-initiate a TCP connection if a connection attempt fails.

Figure 23:
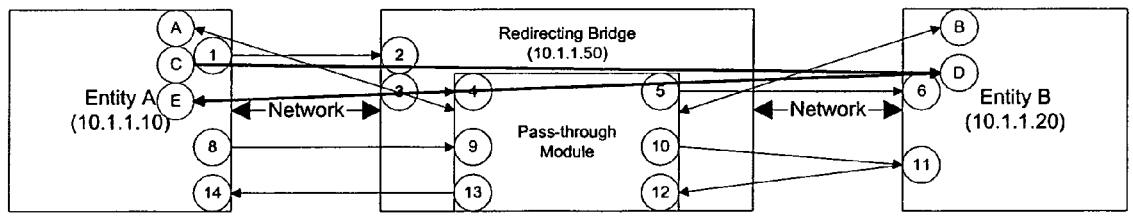
FIG. 23 shows a simplified schematic view of a failover while the Pass-through Module is proxying both entitles in accordance with an embodiment of the present invention.

FIG. 23 is a simplified flow diagram illustrating one failure scenario. In the scenario illustrated in FIG. 23, the system goes into failover while the Pass-through Module is proxying data between the host and tool. The following steps describe how the failover is handled in this scenario.

A. Entity A has an established TCP link with the Pass-through Module before failover
B. Entity B has an established TCP link with the Pass-through Module before failover
<Failover Occurs>
   The connection between Entity A and Entity B will timeout according to the HSMS protocol. If Entity A is waiting for a reply from Entity B this timeout will be governed by the T3. After this timeout the TCP connection will be reset. Entity A and Entity B might happen to timeout at the same time; however their timeout counters are independent of each other.
C. Entity A initiates a TCP connection with Entity B
D. Entity B receives the initiation and replies to Entity A
E. The TCP link between the two entities is established and normal HSMS communication can now occur between both entities.

The theoretical disconnect time for this failure scenario is T3+T5=50 seconds

Figure 24:
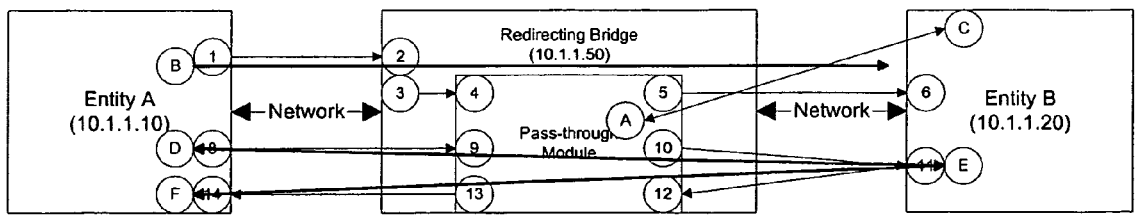
FIG. 24 shows a simplified schematic view of a failover while only the Pass-through Module and tool are communicating in accordance with an embodiment of the present invention.

FIG. 24 is a simplified schematic diagram of another failover scenario. In the failover scenario illustrated in FIG. 24, the system goes into failover while the Pass-through Module and Entity B are communicating with each other and Entity A is does not have a TCP link.

A. The Pass-through Module has an established TCP and HSMS communication link with Entity B.
<Failover Occurs>
   The connection between the Pass-through Module and Entity B will timeout according to the HSMS protocol. This timeout is governed by the T5 timeout.
B. Entity A attempts to initiate a connection with Entity B before the timeout of the original the Pass-through Module and Entity B connection and is refused.
C. The original connection between Entity B and the Pass-through Module times out (T3) on Entity B, allowing entity B to accept connections
D. The original connection attempt by Entity A with Entity B times out and is attempted again.
E. Entity B receives the connection attempt from Entity A and replies The link between Entity A and B is established and normal HSMS communication can occur between both entities.

The theoretical disconnect time for this scenario is T3+T5=50 seconds.

If there were to be a failover where only Entity A and the Pass-through Module are communicating, nothing would occur until that connection times out. After this timeout, Entity A will attempt to connect with Entity B as shown in the above scenarios.

Figure 25A:
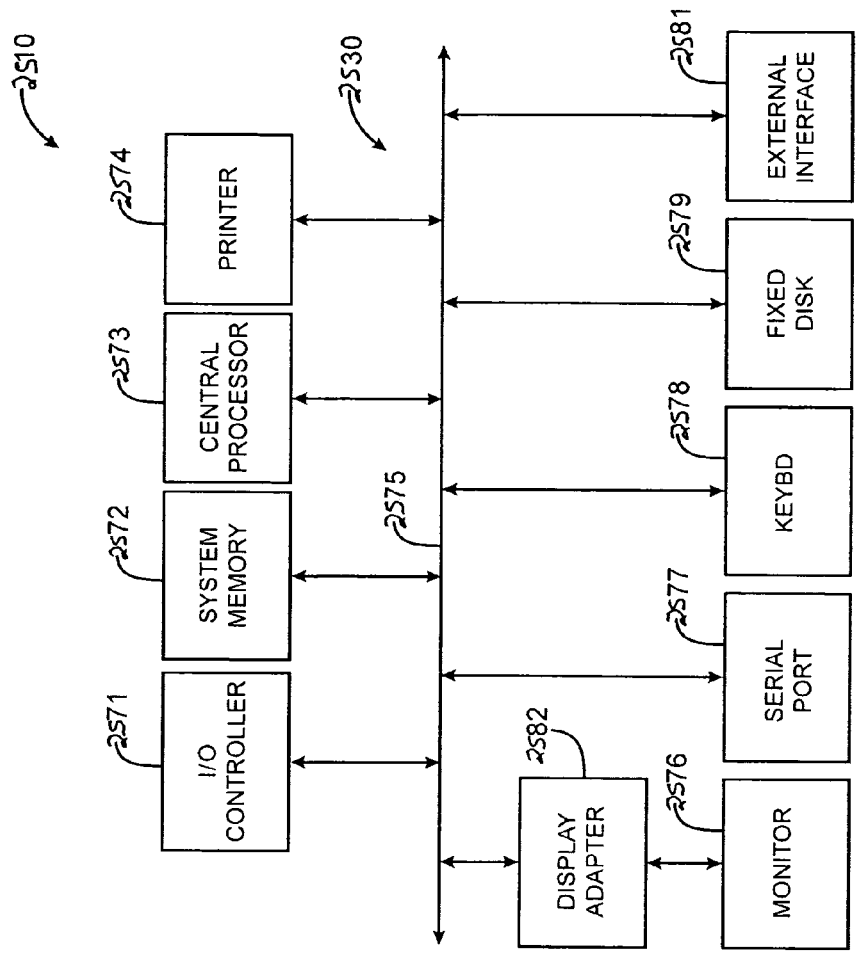
FIG. 25A shows a simplified schematic view of a basic subsystems of the computer system of FIG. 25.
Figure 25:
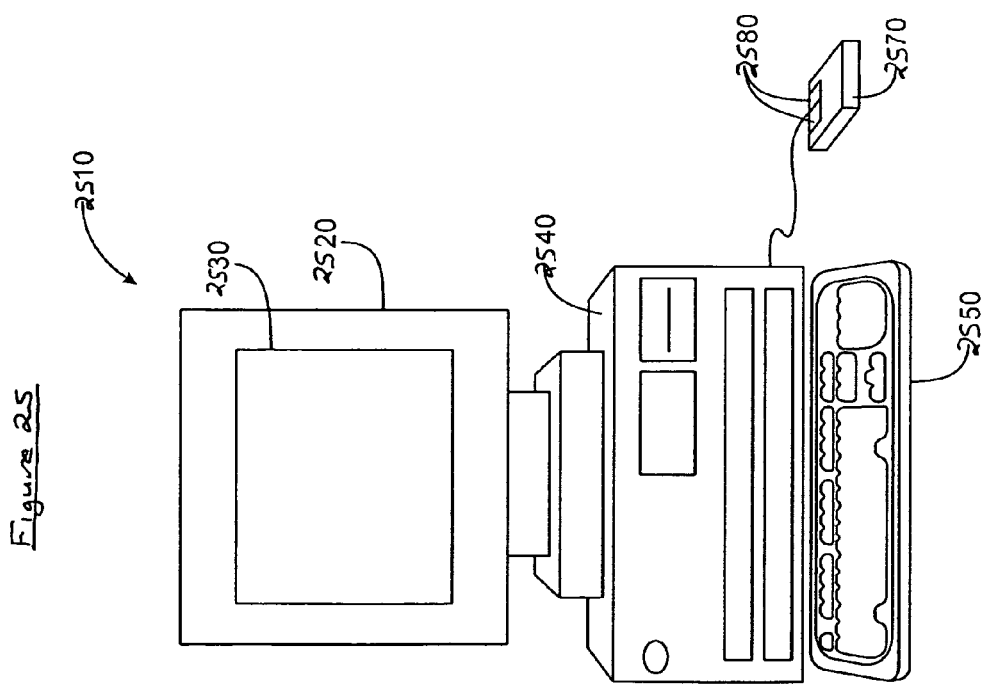
FIG. 25 shows a simplified schematic view of an embodiment of a host computer system for use in accordance with an embodiment of the present invention.

FIG. 25 shows an embodiment of computer system 2510 including display device 2520, display screen 2530, cabinet 2540, keyboard 2550, and mouse 2570. In accordance with particular embodiments of the present invention, the display device and the display screen can be utilized to display to a user an intercepted HSMS message.

Mouse 2570 and keyboard 2550 are representative "user input devices." Mouse 2570 includes buttons 2580 for selection of buttons on a graphical user interface device. Other examples of user input devices are a touch screen, light pen, track ball, data glove, microphone, and so forth. In accordance with still further embodiments of the present invention, the intercepted HSMS message may be modified utilizing one of more user input devices, and the modified message forwarded on to a recipient such as the tool, the host of the fabrication facility, or another computer.

FIG. 25 is representative of but one type of system for embodying the present invention. It will be readily apparent to one of ordinary skill in the art that many system types and configurations are suitable for use in conjunction with the present invention. In a preferred embodiment, computer system 2510 includes a Pentium class based computer, running Windows NT operating system by Microsoft Corporation. However, the apparatus is easily adapted to other operating systems and architectures by those of ordinary skill in the art without departing from the scope of the present invention.

As noted, mouse 2570 can have one or more buttons such as buttons 2580. Cabinet 2540 houses familiar computer components such as disk drives, a processor, storage device, etc. Storage devices include, but are not limited to, disk drives, magnetic tape, solid state memory, bubble memory, etc. Cabinet 2540 can include additional hardware such as input/output (I/O) interface cards for connecting computer system 2510 to external devices external storage, other computers or additional peripherals, further described below.

FIG. 25A is an illustration of basic subsystems in computer system 2510 of FIG. 25. This diagram is merely an illustration and should not limit the scope of the claims herein. One of ordinary skill in the art will recognize other variations, modifications, and alternatives. In certain embodiments, the subsystems are interconnected via a system bus 2575. Additional subsystems such as a printer 2574, keyboard 2578, fixed disk 2579, monitor 2576, which is coupled to display adapter 2582, and others are shown. Peripherals and input/output (I/O) devices, which couple to I/O controller 2571, can be connected to the computer system by any number of means known in the art, such as serial port 2577. For example, serial port 2577 can be used to connect the computer system to a modem 2581, which in turn connects to a wide area network such as the Internet, a mouse input device, or a scanner. The interconnection via system bus allows central processor 2573 to communicate with each subsystem and to control the execution of instructions from system memory 2572 or the fixed disk 2579, as well as the exchange of information between subsystems. Other arrangements of subsystems and interconnections are readily achievable by those of ordinary skill in the art. System memory and fixed disks are examples of tangible media for storage of computer programs. Other types of tangible media include floppy disks, removable hard disks, optical storage media such as CD-ROMS and bar codes, and semiconductor memories such as flash memory, read-only-memories (ROM), and battery backed memory.

While the above description has focused upon the use of the application in connection with a tool and host communicating via an Ethernet network, embodiments in accordance with the present invention are not limited to this particular application. In accordance with alternative embodiments, the semiconductor fabrication tool and a host could be configured to communicate utilizing another type of network or bus protocol, including but not limited to RS-485, DeviceNet, ProfiBus, and TokenRing.

Embodiments in accordance with the present invention are also not limited to facilitating communication between a semiconductor processing tool and any particular type of host system. Examples of manufactured host systems include but are not limited to Asyst Technologies, Inc., Brooks Automation, Inc., Cimetrix Inc., and factory home-grown host systems.

Similarly, embodiments in accordance with the present invention are not limited to the communication of information between a host and any particular type of semiconductor fabrication tool. Examples of manufacturers of semiconductor fabrication tools include but are not limited to Applied Materials, Inc., LAM Research Corp., Tokyo Electron Limited, Novellus Systems, Inc., ASM International N.V., Hitachi Limited, Canon, Inc., and Fujitsu Limited. Examples of tool types able to be communicated with utilizing embodiments in accordance with the present invention include but are not limited to etching tools, deposition tools, chemical mechanical polishing tools, lithography tools, and metrology tools.

In addition, embodiments in accordance with the present invention are not limited to uses in the semiconductor industry. Other industries in which this invention may be applicable include but are not limited to the manufacture of plasma and liquid crystal displays, solar panel manufacturing, industrial diamond manufacturing, and other industries employing tools similar to those used in semiconductor manufacturing.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of intercepting and modifying HSMS (High speed SECS Message Service) messages encoded in IP (Internet protocol) packets, the method comprising:
   at a redirecting bridge, receiving one or more IP packets which are part of an HSMS message, the one or more IP packets being sent from a first HSMS entity to a second HSMS entity through the redirecting bridge across two Ethernet ports and forwarded to a pass-through agent using a first IP routing rule on the redirecting bridge;
   assembling a portion of the HSMS message using the received one or more IP packets;
   generating a set of HSMS system bytes, separate from IP header bytes;
   modifying the assembled portion of the HSMS message by replacing an original set of HSMS system bytes with the generated set of HSMS system bytes to avoid duplicate system bytes in two concurrent HSMS messages;
   encoding the assembled portion of the HSMS message into one or more encoded IP packets;
   sending the one or more encoded IP packets to the second HSMS entity;
   storing, to a computer readable storage device, a mapping between the original set of HSMS system bytes and the generated set of HSMS system bytes;
   intercepting a secondary HSMS message response from the second HSMS entity;
   extracting HSMS system bytes from the secondary HSMS message response;
   determining the original set of HSMS system bytes using the extracted HSMS system bytes from the stored mapping;
   replacing the extracted HSMS system bytes of the secondary HSMS message response with the original set of HSMS systems bytes; and
   forwarding the modified secondary HSMS message response to the first HSMS entity.

2. The method of claim 1, wherein the first IP routing rule causes an original destination IP address of an IP packet header of an IP packet from the received one or more IP packets to be replaced with an IP address of the pass-through agent.

3. The method of claim 1 further comprising:
   altering the one or more IP packets sent from the pass-through agent to the second HSMS entity to appear as if the altered IP packets were sent from the first HSMS entity using a second IP routing rule.

4. The method of claim 3, wherein the second IP routing rule causes a source IP address field on the one or more IP packets to be changed from the IP address of the pass-through agent to the IP address of the first HSMS entity.

5. The method of claim 1, wherein the two Ethernet ports are to be shunted together in response to a system failure.

6. The method of claim 5 further comprising:
   sending a periodic keep-alive signal to a watchdog timer, wherein the two Ethernet ports are automatically shunted together if the watchdog timer fails to receive the keep-alive signal for longer than a predetermined timeout period.

7. A system comprising:
   a first HSMS (High speed SECS Message Service) entity configured to be in communication with a second HSMS entity through an Ethernet network;
   a computer situated along the network path between the first and the second HSMS entities, the computer including instructions that when executed cause the computer to:
   provide Ethernet-based network connectivity between the first HSMS entity and the second HSMS entity using a transparent redirecting bridge across two Ethernet ports, and
   intercept one or more IP (Internet protocol) packets sent from the first HSMS entity to the second HSMS entity using a first IP routing rule on the redirecting bridge; and
   a pass-through agent module in communication with the computer, the pass-through agent module is operable to:
   generate a set of HSMS system bytes, which are different from IP header bytes,
   modify a HSMS message in the intercepted one or more IP packets by replacing an original set of HSMS system bytes with the generated set of HSMS system bytes to avoid duplicate system bytes in two concurrent HSMS messages,
   encode the HSMS message into one or more encoded IP packets,
   send the one or more encoded IP packets to the second HSMS entity,
   store, to a computer readable storage device, a mapping between the original set of HSMS system bytes and the generated set of HSMS system bytes,
   intercept a secondary HSMS message response from the second HSMS entity,
   extract HSMS system bytes from the secondary HSMS message response,
   determine the original set of HSMS system bytes using the extracted HSMS system bytes from the stored mapping, replace the extracted HSMS system bytes of the secondary HSMS message response with the original set of HSMS systems bytes, and forward the modified secondary HSMS message response to the first HSMS entity.

8. The system of claim 7, wherein the pass-through agent module is further operable to:

create a new HSMS message using said generated HSMS system bytes;

encode the new HSMS message into a set of IP and packets; and send the set of IP packets to the second HSMS entity.

9. The system of claim 7 wherein the pass-through agent comprises a watchdog timer configured to engage the bypass function if the watchdog timer is not reset within a timeout period.

10. The system of claim 7 wherein the first HSMS entity comprises a processor in a manufacturing tool.

11. The system of claim 7 wherein the first HSMS entity comprises a computer of a factory host automation system.

12. The method of claim 1, further comprising:

creating a new HSMS message using the generated set of HSMS system bytes, wherein the new HSMS message destined for the second HSMS entity and spoofs an originator of the new HSMS message as the first HSMS entity;

encoding the new HSMS message into a set of IP packets; and sending the set of IP packets from the pass-through agent using the redirecting bridge across the two Ethernet ports to the second HSMS entity.

\* \* \* \* \*